United States Patent Office 3,555,010
Patented Jan. 12, 1971

3,555,010
5-ALKENYL SUBSTITUTED-1,4-BENZODIAZEPINES
Stephen T. Ross, Berwyn, Pa., assignor to Smith Kline & French Laboratories, Philadelphia, Pa., a corporation of Pennsylvania
No Drawing. Continuation-in-part of application Ser. No. 625,636, Mar. 24, 1967. This application Jan. 7, 1970, Ser. No. 1,309
Int. Cl. C07d 53/06
U.S. Cl. 260—239           16 Claims

ABSTRACT OF THE DISCLOSURE 2,3 - dihydro - 1,4 - benzodiazepines which have a 5-lower alkenyl substituent, a chloro or trifluoromethyl substituent on the benzene ring and an optional 1-lower alkyl, alkanoyl, alkoxycarbonyl, cycloalkylloweralkyl, phenyl or diloweralkylaminoloweralkyl substituent and corresponding 2,3,4,5-tetrahydro derivatives are useful as tranquilizers. The basic compounds are generally prepared by reaction of an appropriate 2-halophenyl alkenyl ketone and an ethylenediamine in a polar solvent and in the presence of a transition metal.

---

This application is a continuation-in-part of application Ser. No. 625,636, filed Mar. 24, 1967, and now abandoned.

This invention relates to novel 5-alkenyl substituted-2,3-dihydro - 1,4 - benzodiazepines which have useful pharmacodynamic activity. More specifically the compounds of this invention have tranquilizing and antianxiety activity as demonstrated in standard animal behavioral test procedures. For example in a rat punishment test, supressed responding produced by foot-shock is significantly attenuated at doses as low as 2.5 mg./kg. orally.

The 5-alkenyl substituted - 2,3 - dihydro - 1,4 - benzodiazepines of this invention are represented by the following general structural formulas:

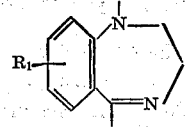

Formula I and

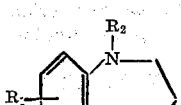

Formula II wherein:
R₁ represents chlorine or trifluoromethyl;
R₂ represents hydrogen, lower alkyl such as methyl, ethyl or isopropyl, lower alkanoyl such as acetyl, propionyl or butyryl, lower alkoxycarbonyl such as methoxy or ethoxycarbonyl, cycloalkylloweralkyl such as cyclopropylmethyl, cyclobutylmethyl or cyclohexylethyl, phenyl or diloweralkylaminoloweralkyl such as dimethylaminopropyl;
R₃ represents lower alkenyl such as allyl or dimethylallyl; and
R₄ represents hydrogen or lower alkanoyl such as acetyl, propionyl or butyryl.

Preferred compound of this invention are represented by Formulas I and II above when R₁ represents chlorine or trifluoromethyl in the 7-position; R₂ represents hydrogen, methyl, acetyl, ethoxycarbonyl, cyclopropylmethyl, phenyl or dimethylaminopropyl; R₃ represents allyl; and R₄ represents hydrogen or acetyl.

By the terms lower alkyl and lower alkoxy where used herein, groups having from 1 to 4 carbon atoms are indicated. The term lower alkanoyl relates to aliphatic carboxylic acid moieties of from 2 to 4 carbon atoms. The terms cycloalkyl and lower alkenyl relate to groups having from 3 to 6 carbon atoms.

This invention also includes addition salts of the compounds of Formulas I and II formed with pharmaceutically acceptable acids. Such acids include both organic and inorganic acids, for example: maleic, fumaric, benzoic, ascorbic, pamoic, succinic, bismethylenesalicyclic, methanesulfonic, ethanedisulfonic, acetic, propionic, tartaric, salicyclic, citric, gluconic, lactic, malic, mandelic, cinnamic, citraconic, aspartic, stearic, palamitic, itaconic, glycolic, p-aminobenzoic, glutamic, benzenesulfonic, hydrochloric, hydrobromic, sulfuric, sulfamic, phosphoric and nitric acids.

The novelty of the compounds of the present invention resides particularly in the presence of an alkenyl substituent in the 5-position of the 2,3-dihydro-1,4-benzodiazepine ring system and the lack of an oxygen function in the 2,3- or 4-position.

Compounds having the basic ring system of Formula I above are prepared by the following process:

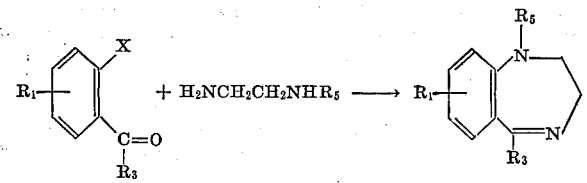

wherein R₁ and R₃ are as defined above, X is halogen preferably chlorine or bromine, and R₅ is hydrogen, lower alkyl, cycloalkylloweralkyl, phenyl or diloweralkylaminoloweralkyl. As shown in the above synthetic scheme an appropriately substituted haloketone is condensed with an ethylenediamine, preferably in the presence of a copper salt such as cupric acetate or sulfate, in a suitable nonreactive polar organic solvent such as dimethylsulfoxide by heating under 100° C. for from 12 to 48 hours.

This process contitutes a part of this invention since the employment of a transition metal salt or a transition metal, preferably a copper salt or copper metal, as a catalyst reduces reaction time to an unexpected degree. The reaction of the haloketone with the ethylenediamine proceeds via initial formation of a ketimine which must isomerize before ring closure can occur. Both the ketimine isomerization and the intramolecular displacement of halogen are catalyzed by these metal salts or metals, schematically represented as follows:

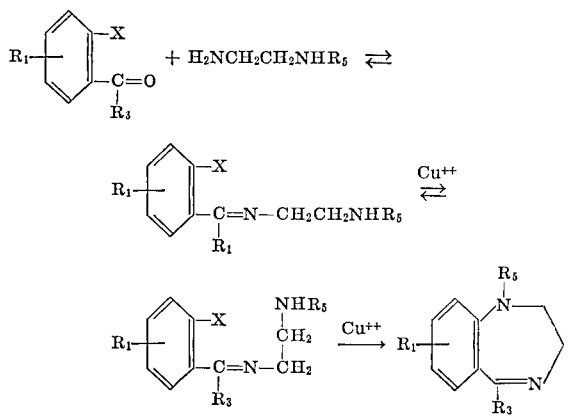

To prepare other 1-substituted derivatives, the 1,4-benzodiazepine prepared as above (where $R_5$ is hydrogen) is reacted with an appropriate acid anhydride such as acetic anhydride to give the corresponding 1-lower alkanoyl derivative or with an appropriate lower alkyl halocarbonate such as ethyl chlorocarbonate to give the corresponding 1-loweralkoxycarbonyl derivative.

The compounds of Formula II above are conveniently prepared from the compounds of Formula I by hydrogenation in the presence of a suitable hydrogenation catalyst. The reduced compounds of Formula II having a lower alkanoyl or lower alkoxycarbonyl substituent in the 1-position or a lower alkanoyl substituent in the 4-position are prepared from the corresponding 1- or 4-unsubstituted reduced compounds by reaction with an acid anhydride or lower alkyl halocarbonate as described above.

The substituted haloketones used as starting materials as described herein are either known or are prepared from corresponding halonitriles by reaction with an appropriate Grignard reagent ($R_3MgX$). Similarly the N-substituted ethylenediamines are prepared by standard methods known to the art.

The compounds of this invention may be administered orally or parenterally in conventional dosage unit forms such as tablets, capsules, injectables or the like, by incorporating the appropriate dose of a compound of Formula I or II with carriers according to accepted pharmaceutical practices.

The foregoing is a general description of how to prepare the compounds of this invention. The following examples illustrate these procedures by the preparation of specific compounds. However this should not be construed as limiting the scope of the invention since appropriate variations in the starting materials will produce other corresponding products set forth in Formulas I and II.

EXAMPLE 1

To a solution of 56.0 g. of 2-chloro-5-trifluoromethylphenyl allyl ketone (prepared from 2-chloro-3-trifluoromethylbenzonitrile and allyl magnesium bromide) and 59.5 ml. of ethylenediamine in 1000 ml. of dimethylsulfoxide is added 100 mg. of cupric acetate and the mixture heated on a steam bath with stirring under nitrogen for 26 hours. The cooled reaction mixture is poured into ice water and the aqueous solution extracted with ether. The washed, dried extract is concentrated to yield 5-allyl-7-trifluoromethyl-2,3-dihydro(1H)-1,4-benzodiazepine.

EXAMPLE 2

A mixture of 23.5 g. of 2-chloro-5-trifluoromethylphenyl allyl ketone, 55.8 g. of N-methyl ethylenediamine and 100 mg. of cupric sulfate in 525 ml. of dimethylsulfoxide is heated and stirred on a steam bath under nitrogen for 24 hours. The cooled reaction mixture is poured into ice water and extracted with ether. The ether extract is washed with water, dried and concentrated. The oily residue is purified by chromatography (alumina/hexane/benzene/chloroform) to give the product 1-methyl-5-allyl-7-trifluoromethyl - 2,3 - dihydro(1H)-1,4-benzodiazepine.

Similarly reaction as described above with 66.2 g. of N-ethyl ethylenediamine yield the corresponding 1-ethyl-5-allyl-7-trifluoromethyl - 2,3 - dihydro(1H)-1,4-benzodiazepine.

EXAMPLE 3

A solution of 3.5 g. of 5-allyl-7-trifluoromethyl-2,3-dihydro(1H)-1,4-benzodiazepine (prepared as in Example 1) in 100 ml. of acetic anhydride is heated to 90° C. and then cooled. Water is added followed by sufficient sodium carbonate to neutralize the reaction mixture. The aqueous mixture is extracted with ether and the extract concentrated. The residue is taken up in methanol and water is added to precipitate the product, 1-acetyl-5-allyl-7-trifluoromethyl-2,3-dihydro(1H)-1,4-benzodiazepine.

Similarly reaction with ethyl chloroformate in chloroform solution at room temperature yields 1-ethoxycarbonyl-5-allyl-7-trifluoromethyl - 2,3 - dihydro(1H)-1,4-benzodiazepine.

EXAMPLE 4

To a solution of 5.6 g. of 5-allyl-7-trifluoromethyl-2,3-dihydro(1H)-1,4-benzodiazepine (prepared as in Example 1) in 55 ml. of ethanol is added 0.2 g. of platinum oxide catalyst and the mixture shaken on a Parr apparatus for about one hour at an initial hydrogen pressure of 50 p.s.i. The reaction mixture is filtered and the filtrate concentrated to give 5-allyl-7-trifluoromethyl-2,3,4,5-tetrahydro (1H)-1,4-benzodiazepine.

EXAMPLE 5

A solution of 2.85 g. of 5-allyl-7-trifluoromethyl-2,3,4,5-tetrahydro(1H)-1,4-benzodiazepine (prepared as in Example 4) in 10 ml. of acetic anhydride is heated to 130° C., cooled and then added to an aqueous solution of sodium carbonate. The resulting mixture is extracted with benzene and the dried extract is concentrated to give 1,4-diacetyl - 5 - allyl - 7 - trifluoromethyl - 2,3,4,5 - tetrahydro(1H)-benzodiazepine.

EXAMPLE 6

A mixture of 21.5 g. of 2,5-dichlorophenyl allyl ketone (prepared from 2,5-dichlorobenzonitrile and allyl magnesium chloride), 24.0 g. of ethylenediamine and 100 mg. of cupric acetate in 500 ml. of dimethylsulfoxide is heated on a steam bath with stirring under nitrogen for 24 hours. The cooled reaction mixture is poured into ice water, extracted with ether and the washed, dried extract is concentrated to give 5-allyl-7-chloro-2,3-dihydro(1H)-1,4-benzodiazepine.

EXAMPLE 7

A mixture of 21.5 g. of 2,5-dichlorophenyl allyl ketone, 54.5 g. of N-phenylethylenediamine and 100 mg. of cupric acetate in 500 ml. of dimethylsulfoxide is heated on a steam bath with stirring under nitrogen for 48 hours. The cooled reaction mixture is poured into ice water and extracted with ether. The washed, dried extract is concentrated to give 1-phenyl-5-allyl-7-chloro-2,3-dihydro(1H)-1,4-benzodiazepine.

EXAMPLE 8

To a solution of 24.8 g. of 2-chloro-5-trifluoromethylphenyl allyl ketone and 45.6 g. of N-cyclopropylmethyl ethylenediamine (prepared from cyclopropylmethyl bromide and ethylenediamine) in 500 ml. of dimethylsulfoxide is added 100 mg. of cupric acetate and the mixture heated on a steam bath with stirring under nitrogen for 24 hours. The cooled reaction mixture is poured into ice water and the aqueous solution extracted with ether. The washed, dried ether extract is concentrated to yield 1-cyclopropylmethyl - 5-allyl-7-trifluoromethyl-2,3-dihydro (1H)-1,4-benzodiazepine.

Similarly reaction as described above with 68.0 g. of N-cyclohexylethyl ethylenediamine (prepared from cyclohexylethyl bromide and ethylenediamine) gives the product, 1 - cyclohexylethyl-5-allyl-7-trifluoromethyl-2,3-dihydro(1H)-1,4-benzodiazepine.

EXAMPLE 9

A mixture of 24.8 g. of 2-chloro-5-trifluoromethylphenyl allyl ketone, 58.0 g. of N-(3-dimethylaminopropyl)-ethylene-diamine (prepared from 3-dimethylaminopropyl chloride and ethylenediamine) and 100 mg. of cupric sulfate in 750 ml. of dimethylsulfoxide is heated on a steam bath with stirring under nitrogen for 24 hours. The cooled reaction mixture is treated with ice water and then extracted with ether. The washed dried extract is evaporated to give 1 - (3 - dimethylaminopropyl)-5-allyl-7-trifluoromethyl-2,3-dihydro(1H)-1,4-benzodiazepine.

EXAMPLE 10

To a solution of 62.2 g. of 2-chloro-5-trifluoromethylphenyl 3,3-dimethylallyl ketone (prepared from 2-chloro-5-trifluoromethylbenzonitrile and 3,3-dimethylallyl magnesium bromide) and 59.5 ml. of ethylenediamine in 1 l. of dimethylsulfoxide is added 100 mg. of cupric acetate and the mixture is heated on a steam bath with stirring under nitrogen for 24 hours. The cooled reaction mixture is poured into ice water and the aqueous solution is extracted with ether. The washed and dried extract is concentrated to give 5-(3,3-dimethylallyl)-7-trifluoromethyl-2,3-dihydro(1H)-1,4-benzodiazepine.

What is claimed is:
1. A chemical compound or a pharmaceutically acceptable acid addition salt thereof, said compound having one of the following formulas:

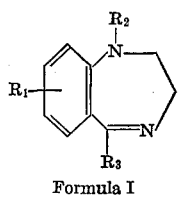

Formula I and

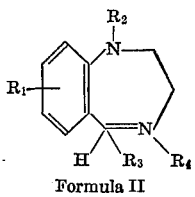

Formula II in which:

$R_1$ is chlorine or trifluoromethyl;
$R_2$ is hydrogen, lower alkyl, lower alkanoyl, lower alkoxycarbonyl, cycloalkylloweralkyl, phenyl or diloweralkylaminoloweralkyl;
$R_3$ is lower alkenyl; and
$R_4$ is hydrogen or lower alkanoyl;
each of said lower alkyl and lower alkoxy moieties having from 1 to 4 carbon atoms, said lower alkanoyl moiety having from 2 to 4 carbon atoms, and said cycloalkyl and lower alkenyl moieties having from 3 to 6 carbon atoms.

2. A chemical compound according to claim 1 in which $R_1$ is 7-chloro or 7-trifluoromethyl; $R_2$ is hydrogen, methyl, acetyl, ethoxycarbonyl, cyclopropylmethyl, phenyl or dimethylaminopropyl; $R_3$ is allyl or dimethylallyl; and $R_4$ is hydrogen or acetyl.

3. A chemical compound according to claim 2 in which $R_3$ is allyl.

4. A chemical compound according to claim 3 having the Formula I.

5. A chemical compound according to claim 4 in which $R_1$ is 7-trifluoromethyl.

6. A chemical compound according to claim 5 in which $R_2$ is hydrogen, being the compound 5-allyl-7-trifluoromethyl-2,3-dihydro(1H)-1,4-benzodiazepine.

7. A chemical compound according to claim 5 in which $R_2$ is acetyl, being the compound 1-acetyl-5-allyl-7-trifluoromethyl-2,3-dihydro(1H)-1,4-benzodiazepine.

8. A chemical compound according to claim 5 in which $R_2$ is methyl, being the compound 1-methyl-5-allyl-7-trifluoromethyl-2,3-dihydro(1H)-1,4-benzodiazepine.

9. A chemical compound according to claim 3 having the Formula II.

10. A chemical compound according to claim 9 in which $R_1$ is 7-trifluoromethyl.

11. A chemical compound according to claim 10 in which $R_2$ and $R_4$ are hydrogen, being the compound 5-allyl - 7 - trifluoromethyl - 2,3,4,5-tetrahydro(1H)-1,4-benzodiazepine.

12. A chemical compound according to claim 10 in which $R_2$ and $R_4$ are acetyl, being the compound 1,4-diacetyl - 5 - allyl - 7 - trifluoromethyl-2,3,4,5-tetrahydro-(1H)-1,4-benzodiazepine.

13. A chemical compound according to claim 2 in which $R_3$ is 3,3-dimethylallyl.

14. A chemical compound according to claim 13 having the Formula I.

15. A chemical compound according to claim 14 in which $R_1$ is 7-trifluoromethyl.

16. A chemical compound according to claim 15 in which $R_2$ is hydrogen, being the compound 5-(3,3-dimethylallyl) - 7 - trifluoromethyl-2,3-dihydro(1H)-1,4-benzodiazepine.

References Cited

UNITED STATES PATENTS 3,244,698   4/1966   Uskokovic et al. ____ 260—239

ALTON D. ROLLINS, Primary Examiner

U.S. Cl. X.R.

260—465, 563, 566, 583, 590, 665; 424—244

UNITED STATES PATENT OFFICE
CERTIFICATE OF CORRECTION

Patent No. 3,555,010          Dated January 12, 1971

Inventor(s) Stepehn T. Ross

It is certified that error appears in the above-identified patent and that said Letters Patent are hereby corrected as shown below:

Column 5, lines 45-55, Formula II should read:

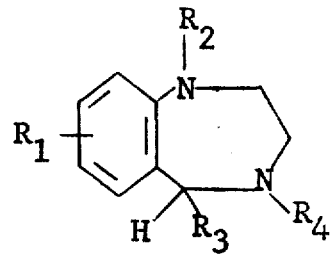

Signed and sealed this 6th day of April 1971.

(SEAL)
Attest:

EDWARD M. FLETCHER, JR.
Attesting Officer

WILLIAM E. SCHUYLER, JR
Commissioner of Patents